United States Patent Office 3,664,764
Patented May 23, 1972

3,664,764
DEVICES OF FIBROUS-REINFORCED
PLASTICS MATERIAL
Stuart Duncan Davies, Roy Fred John McCarthy, and
Richard James Watts, Cheltenham, England, assignors
to Dowty Rotol Limited, Gloucester, England
Filed June 25, 1970, Ser. No. 49,742
Claims priority, application Great Britain, July 18, 1969,
36,422/69
Int. Cl. F01d 5/30
U.S. Cl. 416—224
8 Claims

ABSTRACT OF THE DISCLOSURE

A device, for example a blade for an aircraft propeller, has an end portion and a portion adjacent thereto both of fibrous-reinforced plastics material. The end portion is enlarged by wedge members which intervene between groups of fibers of the material and which are so shaped that the fibres pass smoothly along curved paths from the end portion to the said portion adjacent thereto.

---

Figure 1:
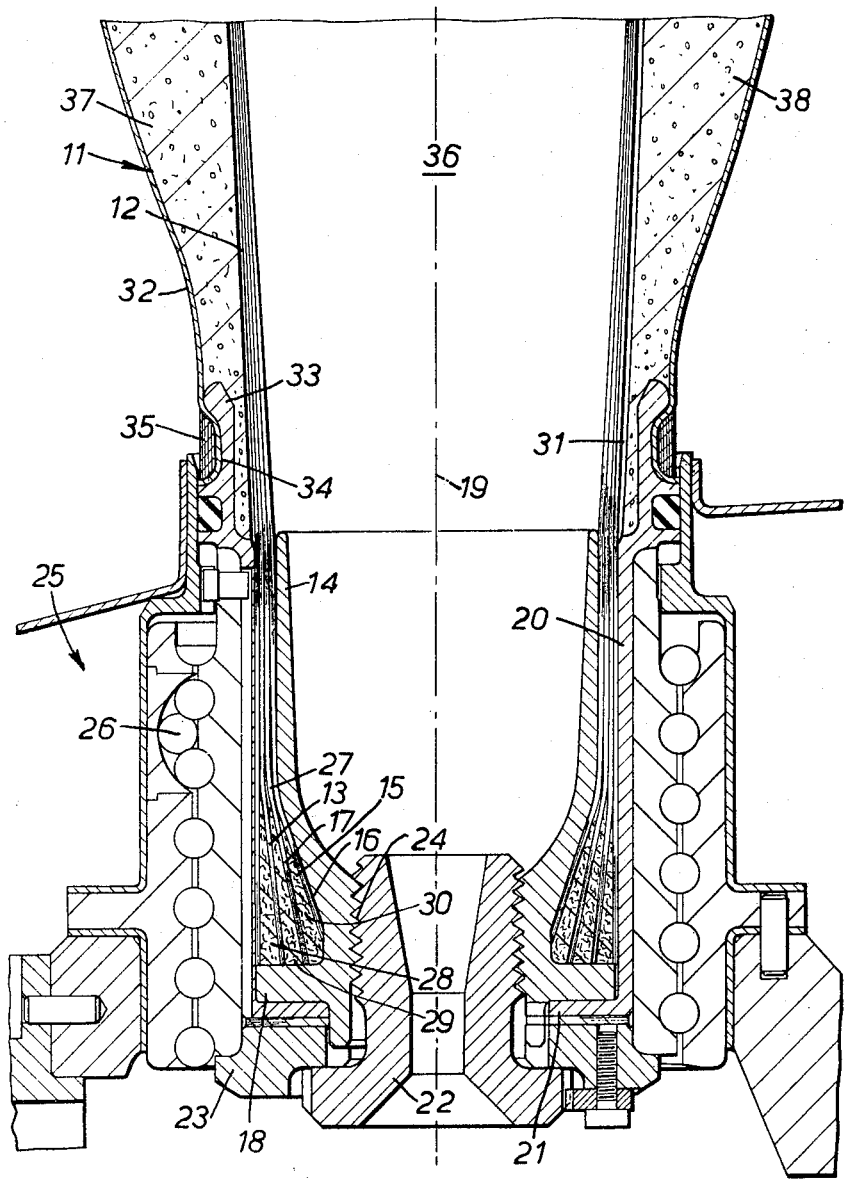

This invention relates to devices at least partly of fibrous-reinforced plastics material.

According to this invention there is provided a device having an end portion and a portion adjacent thereto both of fibrous-reinforced plastics material, the end portion being enlarged by wedge members which intervene between groups of fibres of the said material and which are so shaped that the fibres pass smoothly along curved paths from one said portion to the other said portion.

By arranging for the fibres to pass smoothly along curved paths, the setting-up of stress concentrations in the fibres is avoided.

The said end portion may be hollow with unlooped fibres which are disposed between two rigid members having their longitudinal axes coincident, said wedge members so splaying said fibres apart that they are grouped between the two rigid members.

Also according to the invention, a blade suitable for a propeller, compressor, fan or the like includes a structure having a hollow root portion of fibrous-reinforced plastics material comprising fibers which are unlooped and disposed between two rigid members having their longitudinal axes coincident, wedge means positioned between certain of said fibres splaying said fibers apart so that they are grouped between the two members.

The root portion, the rigid member and the wedge means may all be of tubular form, concentrically arranged.

According to another aspect of the invention, a blade, suitable for a propeller, compressor, fan or the like, includes a member of fibrous-reinforced plastics material having a root portion which is of substantially tubular form and which is held between two rigid concentric members of substantially cylindrical shape, the space between opposing surfaces of these members increasing in cross-sectional area in a dircetion towards the ends of the fibers and root portion, thus to enable said fibres to be splayed apart by hollow wedge means extending into the root portion from the free ends of the fibres, to wedge the material into engagement with said opposing surfaces for positive retention of said root portion with respect to said concentric members.

At least some of the fibers of the material may be carbon fibres which are impregnated with a resin, for example, an epoxy resin.

The said rigid members may be of metal, and preferably have their common longitudinal axes coincident with the longitudinal axis of the blade.

The member of fibrous-reinforced plastics material may be so shaped outwardly from the root portion as to form the working portion of the blade. Alternatively, this member may form a spine which runs at least part-way along the length of the blade. In this case the working portion of the blade may comprise structure carried upon the spine, which includes a shell of resin-impregnated fibrous material. The shell may be provided with a light-weight filler material, for example, polyisocyanates in foaming composition.

The spine may also be filled with a similar light-weight filler material.

The spine may comprise two parts which abut in a plane which also contains the longitudinal axis of the blade, and in this case the outer of the two rigid members may also comprise two parts which abut in a plane which also contains the longitudinal axis of the blade. The two parts of the spine and/or the two parts of the outer rigid member may be held together in unit or sub-unit assembly by means of a layer or layers of fibrous-reinforced plastics material wrapped therearound at a desired angle, or desired angles, with respect to the blade longitudinal axis.

Where the outer of the rigid member is of tubular form, it may be of constant diameter and the outer surface of the inner rigid member so shaped as to be convergent in a direction towards the free root end of the blade remote from the tip and hence divergent in that direction with respect to the constant diameter inner surface of the outer rigid member, so that the wedge means splay the fibrous material of the root portion in a direction towards the blade longitudinal axis.

Alternatively, the converse may be the case so that the wedge means splay the fibrous material of the root portion in a direction away from the blade longitudinal axis.

Alternatively, again, the opposing surfaces of the inner and the outer rigid members may both be in part non-cylindrical and relatively divergent in a direction towards the end of the blade remote from the tip, so that the wedge means splay the fibrous material of the root portion, those fibres adjacent to the inner rigid member towards the blade longitudinal axis and those adjacent the outer rigid member away from the blade longitudinal axis.

Both rigid members may be suitably bolted or otherwise held together at their root portions and means may be provided for their attachment into or onto a rotor hub.

Where the said end portion of the device is not hollow the curved external faces of said end portion may carry pads, in intimate contact with said faces, which build up the cross-section of the end portion to a desired overall shape suitable for retention of the device in a slot of corresponding shape.

Where the device is a blade suitable for a compressor, propeller, fan or the like, the said end portion may be the blade root portion and said desired overall shape may be dove-tail, said slot being formed in the drum, hub, disc or the like of the compressor, propeller, fan or the like, or alternatively, formed in a member which is itself mounted either fixedly or adjustably in said drum, hub, disc or the like.

The length of the slot may run parallel, or substantially so, to the rotational axis of the drum, hub, disc or the like, and said wedge members, which may be parallel thereto also, extend into the root portion from the extremity thereof, their fibre-wedging action being in a direction away from said axis.

Also, according to the invention, there is provided a method of producing a fibrous-reinforced plastics blade including the steps of: (a) forming a member of fibrous-reinforced plastics material in a mould, the portion of the member intended to form the blade root portion having its fibres splayed apart, diverging in a direction towards their free root ends, by hollow wedge means, (b) curing the assembl, (c) mounting said member of fibrous-reinforced plastics material upon a first rigid member, and, (d) fitting a second rigid member around the root portion.

According to another aspect of the invention there is provided a method of producing a fibrous-reinforced plastics blade including the steps of: (a) forming the two complementary parts of a two-part member of fibrous-reinforced plastics material in separate moulds, those portions of these parts which together are intended to form the blade root portion having their fibres splayed apart, diverging in a direction towards the free root ends of the fibres, by hollow wedge means, (b) curing said two parts, (c) mounting the two parts at their root portions upon a first rigid member so that they and the wedge means abut in a longitudinal plane, (d) fitting a second rigid member around the root portion so formed, (e) wrapping at least one layer of a fibrous-reinforced plastics material around a part at least of the assembled complementary parts, and, (f) subjecting the assembly to a curing process.

The assembly so produced in accordance with either of the two preceding paragraphs may in itself constitute a substantially finished blade, or it may be necessary to attach to the assembly additional structure to complete the blade working portion.

The hollow interior spaces of the assembly may be filled with a light-weight material, for example, polyisocyanates in foaming composition.

Figures 2, 3:
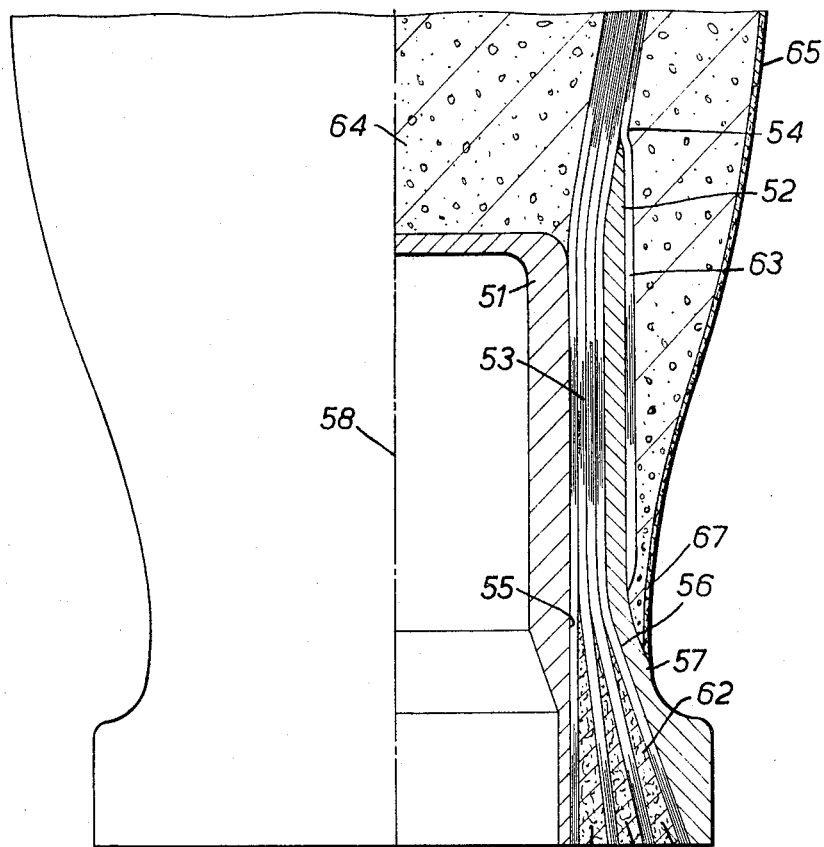

Three embodiments of the invention will now be particularly described by way of example with reference to the accompanying drawings, of which, FIG. 1 is a cross-section of part of a propeller blade construction in accordance with the first embodiment, FIG. 2 is a cross-section of a part of a porpeller blade construction in accordance with the second embodiment of the invention, and FIG. 3 is a cross-section of part of a propeller blade construction in accordance with the third embodiment of the invention.

Referring to FIG. 1 of the drawing, a blade, part of which is shown at 11, suitable for an aircraft propeller, comprises a hollow spine 12 which at its root portion 13 is of annular cross-section and is mounted upon a one-piece generally cylindrical rigid member 14 of steel. This member 14 is formed with a recess 15 of annular shape whose curved surface 16 is so profiled as to provide a space 17 whose cross-sectional area increases towards the extremity of the blade root where the member 14 terminates in a flange 18. The spine 12 is formed in two parts, each of generally semi-circular cross-section towards the blade root portion, which abut each other in a plane which contains the longitudinal axis 19 of the blade. The root portion 13 is enclosed by another generally cylindrical rigid member 20 of steel, but this member is, like the spine, formed in two parts which abut each other in a plane which contains the longitudinal axis 19. The lower end portion in the drawing of the member 20 is formed with a flange 21 which is held in engagement with the flange 18 by a hollow bolt 22 through the intermediary of a ring member 23. The bolt screws into the member 14 at 24.

The root portion 13, and the two rigid members 14 and 20 are all concentrically arranged, the arrangement being such that the blade can readily be attached to the propeller hub 25 in a blade root bearing 26 of ball-type.

The hollow spine 12 is of fibrous-reinforced plastics material, the plastics substance being an epoxy resin and the fibrous content being carbon fibres as shown at 27. The fibres at the root portion 13 are unlooped and splayed apart in groups, as shown, by wedge members 28, 29 and 30 of epoxy resin-impregnated glass fibre material, certain of the carbon fibres 27 converging, as determined by the shape of the recess 15, inwardly towards the axis 19. The wedge members 28, 29 and 30 are of hollow longitudinally-tapered form and are separately formed with each of the two halves of the spine. By so locating the fibres in the recess, a secure and positive method of retention of the spine with respect to the rigid steel root members is achieved. The spine 12 extends substantially for the whole length of the blade 11, its cross-section changing as it progresses away from the root portion 13 to varying shapes, in part conforming with the required aerofoil cross-sections of the blade working portion. The two parts of the spine are held in unit assembly by a wrapping 31 of epoxy resin-impregnated carbon fibre material wound at an angle of 45 degrees with respect to the blade longitudinal axis to achieve a high degree of torsional stiffness.

The full aerofoil cross-section of the blade at the various stages along its length is completed by the provision of a blade working portion shell 32 of epoxy resin-imprengated glass fibre material.

The shell 32 is secured at its end portion remote from the blade tip to the outermost portion 33 of the rigid member 20 remote from the flange 21. At this position the glass fibre material seats into an annular recess 34, being retained therein by a suitable clamp wrapping 35.

The interior 36 of the hollow spine 12 and the spaces 37 and 38 between the wall of the shell 32 and the spine 12 are filled with polyisocyanates material in foaming composition.

Such a blade is manufactured by first laying-up the two parts of the spine 12, each in a respective mould. In laying-up the epoxy resin-impregnated carbon fibres in pre-impregnated sheet form into the mould, layers of glass-fibre impregnated with an epoxy resin are interposed between the layers of carbon fibre at the root portion to provide the hollow wedge members, whereby the carbon fibres are splayed apart. Since the root portion is substantially of tubular form the hollow wedge members are each half cylindrical. Thus, the surfaces of each spine-half mould component at the portion thereof corresponding to the spine root conform in shape to the shape of the surfaces of the two rigid members.

The remaining portions of the two spine-halves are so shaped as progressively to flatten in the blade tip direction.

The two spine-halves, in their respective moulds, are now cured at 130° C. for a period of 16 hours and then removed from the mould.

The two spine-halves are next mounted upon the rigid member 14, and the assembly is placed in a mould which conforms approximately in shape to the finished blade. In this mould the two parts of the spine do not abut in the plane which contains the longitudinal axis of the blade because a clearance is provided so that when the mould is closed, polyisocyanates material in foaming composition can be introduced to the interior of the spine 12 through the aperture of the hollow bolt 22. This material also passes through the clearances between the two parts of the spine and fills up the cavities of the mould between the spine and the blade-defining surface of the mould.

This assembly is cured at 130° C. for 16 hours and when removed from the mould the leading edge and trailing edge blocks of polyisocyanates material are sawn away from the spine, but safely stacked for use in later steps of the process.

The spine, complete with the inner rigid member 14 is now wrapped at an angle of 45° to the blade longitudinal axis with epoxy resin-impregnated carbon fibre layers to hold the two spine components together in abutting, unit assembly.

The leading edge and trailing edge polyisocyanates blocks and the spine are now placed in a final mould together to form the basic structure of the blade working portion and the blade root, and the blade working portion is wrapped with dry glass fibre material. This material is of bi-directional type and there are seven layers thereof. Following closure of the mould the assembly is subjected to an epoxy resin injection process and this is followed by curing again at 130° C. for 16 hours.

Following removal from the mould, the end portion of the shell 32 remote from the blade tip is positively clamped into the recess 34 in the rigid member 20 by the clamp wrapping 35, which takes the form of a suitable winding of glass-fibre.

Thereafter, the shell 32 is subjected to a sprayed polyurethane/rubber coating process.

Referring now to FIG. 2 of the drawings, the propeller blade partly shown in cross-section is similar to that of the first embodiment in that two rigid steel members 51 and 52, generally cylindrical in shape and concentrically arranged, serve positively to retain the epoxy resin-impregnated carbon fibre material 53 of a spine 54, the outer rigid member 52 being in two parts. However, in this case the inner rigid member 51 has an external surface 55 of constant diameter, while the internal surface 56 of the portion 57 of the outer rigid member 52 remote from the tip of the blade flares outwardly away from the blade longitudinal axis 58 in a direction towards the root extremity. Longitudinally-tapered wedge members 59, 60 and 61 of epoxy resin-impregnated glass-fibre splay the unlooped fibres of the root portion 62 apart in groups in the manner shown, again to provide a positive method of retention of the fibres with respect to the members 51 and 52.

The spine and part of the member 52 are wrapped at an angle of 45° to the axis 50 with several layers, as at 63, of resin-impregnated carbon fibre material, and the interior 64 of the spine is filled with polyisocyanates in foaming composition. In a manner similar to that of the construction of FIG. 1, polyisocyanates material is also foamed externally of the spine to define the blade working portion, and the assembly is wrapped with epoxy resin-impregnated glass fibrous material to form a shell 65.

As shown in the drawing, the base 67 of the shell 65 is not clamped, as in the construction of FIG. 1, to the outer rigid member 52, but is instead bonded thereto by the use of a suitable adhesive.

A blade as above described is produced in a way similar to that of the first embodiment, by pre-forming the spine 54 and wedge members 59, 60 and 61, each in two halves. Thereafter, the introduction of the polyisocyanates material, the wrapping of the spine components with the resin-impregnated carbon fibre material, the curing, the dry wrapping of the blade working portion with bi-directional glass fibre sheet, the resin injection and the final curing are similar to those of the first embodiment.

In the embodiments of both FIGS. 1 and 2 the smoothly-curved fibre-engaging faces of the wedge members ensure that the fibrous groups at the blade root portion follow a smoothly-curved path, and thus the setting-up of undesirable stress concentrations in the fibres at the root portion is avoided thereby achieving a root construction which is less liable to fail at a relatively early stage in its life than a blade having a root portion whose fibres change direction abruptly.

With reference now to FIG. 3 of the drawings, the blade 111, which is partly shown, is suitable for fitment to the hub 112 of a rotary fan, a suitable slot 113 of dove-tail shape being provided in the hub to receive the root portion 114 of the blade.

The blade comprises groups of carbon fibres 115 impregnated with an epoxy resin, so moulded as to form a working portion 116 of desired aerofoil cross-sectional shape. The groups of carbon fibres at the root portion are unlooped and splayed apart as shown in the drawing to form the basis of the dove-tail shape of the root portion, being smoothly curved from the working portion towards the extremity of the root portion. This splaying apart of the fibres is produced by the provision of five wedge members 117 pre-formed from glass-fibre material impregnated with an epoxy resin and tapered in cross-sectional shape, being so curved as to produce the smooth curvature in the fibres.

The length of the slot 113 runs parallel to the rotational axis of the hub, and the wedge members which are straight for the length of the slot are generally parallel to this axis. As shown, the wedge members extend at the root portion 114 from the base thereof, their fibre-wedging action being in a direction away from the said axis.

The resultant curved external faces 118 and 119 of the assembly of carbon fibre-reinforced plastics material so formed carry load pads 120 and 121 respectively, made from glass fibre material impregnated with an epoxy resin and pre-cured. These pads are in intimate contact with the faces 118 and 119 and are of the cross-sectional shape shown in the drawing, with flat outer faces 122 and 123, to build up the blade root portion to a true dove-tail shape cross-section, so that when the blade is mounted in the dove-tail slot 113, the root portion 114 is a close fit therein.

Thus, the construction of this embodiment is not basically hollow, cylindrical as in the embodiments of FIGS. 1 and 2, but like the constructions of FIGS. 1 and 2, the fibrous groups of the blade root portion are caused by the wedge members to follow a smoothly-curved path, and thus the setting up of undesirable stress concentrations in the fibres at the root portion is avoided, thereby achieving a root construction which again is less liable to fail at a relatively early stage in its life than a blade having a root portion whose fibres change direction abruptly.

The blade of this third embodiment is produced by laying-up in a first half-mould of suitable shape, forty layers of unidirectional carbon fibrous material in sheet form pre-impregnated with an epoxy resin thus to form said groups of fibres running the length of the blade from root portion to tip portion.

The wedge members 117 are already pre-formed by laying-up ten layers of glass fibre material pre-impregnated with an epoxy resin in a suitably-shaped mould and curing at 130° C. for 16 hours. Also, the load pads 120 and 121 are pre-formed in a similar way, one of these load pads being placed in the first half-mould at the root portion before laying-up of the forty layers therein is commenced.

The required splaying apart of the groups of fibres at the root portion during laying-up in the first half-mould is produced by inserting the pre-formed glass fibre/epoxy resin wedge members between these groups at appropriate positions across the root portion as the assembly progresses, thus to produce the root end enlargement and the basis of the dove-tail shape.

When the forty layers of carbon fibrous material and the five wedge members are all present in the first half-mould, the second load pad is placed in position at the root portion, and the second half-mould is then clamped to the first half-mould to enclose the laid-up fibrous assembly.

The assembly is now cured at 130° C. for a period of 16 hours.

Upon removal of the cured assembly from the mould, it is sprayed with a polyurethane/rubber protective coating, and when this is dry the finished blade is ready to be fitted into its slot 113 in the hub 112 of the fan.

The invention is not limited to the number of wedges described in the above embodiments, as in other embodiments different numbers of wedges may be used. The wedges may alternatively be of different cross-sectional shapes than those described, but nevertheless maintaining the smoothly-curved path of the fibrous groups at the blade root portion.

Instead of certain of the root fibres being splayed either towards the blade longitudinal axis as in the case of the first embodiment described with reference to FIG. 1, or away from the blade longitudinal axis as in the case of the second embodiment described with reference to FIG. 2, in an alternative root construction certain of the fibres may be splayed towards the longitudinal axis and others splayed away from the longitudinal axis, the inner and outer rigid members then having their opposing surfaces shaped accordingly for this purpose.

Although in the two embodiments described with reference to FIGS. 1 and 2, the spine member is formed initially in two parts, in other embodiments it may initially be formed in one piece. Further, the spine may in fact form the root portion and the working portion of the blade, thus in such embodiments eliminating the need for the shell, such as at 32 and 65 in FIGS. 1 and 2 respectively, defining the working portion. Further although in the two embodiments described with reference to FIGS. 1 and 2 of the drawings, the rigid members are of steel, in other embodiments they may be of a different metal, or again of a suitable non-metallic material. The invention is not limited to the root portion or the rigid members being of the circular, hollow, cross-section shown in FIGS. 1 and 2, as in other embodiments the root portions and rigid members may be of other suitable cross-section whereby the fibres of the root portion are received, and positively held in a space between the two rigid members and whereby hollow wedge members can be introduced at this space into the free ends of these fibres to splay them apart for retention, affording avoidance of the setting-up of stress concentrations in the fibres at said end portion by producing the desired smooth curvature of the fibres of said end portion. Also, the invention is not limited to the precise shape of the root portion or of the wedge members of the embodiment described with reference to FIG. 3 of the drawings, as again in other embodiments other shapes of root portion, and other suitable shapes of wedge members may be provided, again avoiding the setting-up of the said stress concentrations.

The invention is not limited to the use of carbon fibres in the root portion or to glass fibres for the wedge members, nor to epoxy resin as the resin with which they are impregnated, as in other embodiments other suitable fibrous material and other suitable resin may with advantage be used. Further, in the case of the embodiment of FIG. 3 the invention is not necessarily limited to the load pads being of glass fibre.

The invention is not limited in its application to propeller blades and fan blades, as in other embodiments it may be applied to compressor blades, or alternatively, to other articles, not necessarily of aerofoil shape, requiring a fibrous end portion by which the article is fittable to another component. For example, the invention may be applied to an aircraft undercarriage member which requires a positive fixing to adjacent airframe structure.

By the invention, and in accordance with the constructions of FIGS. 1 and 2, a fibrous reinforced plastics device is produced having good torsional stiffness throughout its length, and strong, positive retention between an end portion thereof and the means used for fitment of the device to some other structure. In particular, with blades, since in one of its aspects the invention facilitates the use of a tubular root construction, the blades are very suitable for use in variable-pitch propellers where they are required to be turned about their longitudinal axes for pitch-change.

Although in the embodiment described with reference to FIG. 3 of the accompanying drawings the blade is arranged for fitment directly into a slot in the hub of a fan, in alternative embodiments the blades may instead be fitted each in a slot or the like formed in a separate member which is itself arranged for fitment in a drum, hub, disc or the like. This separate member may be rigidly attached to said drum, disc or the like, or alternatively, it may be so mounted therein as to afford the blade adjustability about its longitudinal axis.

We claim:

1. A device having an end portion and a portion adjacent thereto, both of fibrous-reinforced plastics material, said end portion including wedge members which intervene between groups of unlooped free end portions of fibres of the said material so as to enlarge said end portion, and said wedge members each having smoothly-curved fibre-engaging faces which converge towards said adjacent portion and which cause the fibres to pass smoothly along curved paths from one said portion to the other said portion without abrupt change in direction, whereby the setting-up of stress concentrations in the fibres is avoided.

2. A device having an end portion and a portion adjacent thereto both of fibrous-reinforced plastics material, said end portion being hollow with unlooped fibres which are disposed between two rigid members having their longitudinal axes coincident, said end portion including wedge members which intervene between groups of free end portions of said fibres so as to enlarge said end portion, and said wedge members splaying said fibres apart so that they are grouped and positively held between the two rigid members, and having smoothly-curved fibre-engaging faces which converge towards said adjacent portion and which cause the fibres to pass smoothly along curved paths from said one portion to the other said portion without abrupt change in direction, whereby the setting-up of stress concentrations in the fibres is avoided.

3. A device having an end portion and a portion adjacent thereto, both of fibrous-reinforced plastics material, said end portion being hollow with unlooped fibres which are disposed between two rigid members having their longitudinal axes coincident, the outer of the rigid members being of tubular form and of constant diameter on its inner surface and the outer surface of the inner rigid member being so shaped as to be convergent in a direction towards the free end of the device and hence divergent in that direction with respect to the constant diameter inner surface of the outer rigid member, said end portion including wedge members which intervene between groups of unlooped free end portions of fibres of the said material so as to enlarge said end portion, and said wedge members splaying said fibres apart so that they are grouped and positively held between the two rigid members, such splaying being in a direction towards the longitudinal axis of the device, and said wedge members having smoothly-curved fibre-engaging faces which converge towards said adjacent portion and which cause the fibres to pass smoothly along curved paths from one said portion to the other said portion without abrupt change in direction, whereby the setting-up of stress concentrations in the fibres is avoided.

4. A device having an end portion and a portion adjacent thereto, both of fibrous-reinforced plastics material, said end portion being hollow with unlooped fibres which are disposed between two rigid members having their longitudinal axes coincident, the inner of the rigid members being of tubular form and of constant diameter on its outer surface and the inner surface of the outer rigid member being so shaped as to be divergent in a direction towards the free end of the device and with respect to the constant diameter surface of the inner rigid member, said end portion including wedge members which intervene between groups of unlooped free end portions of fibres of the said material so as to enlarge said end portion, and said wedge members splaying said fibres apart so that they are grouped and positively held between the two rigid members, such splaying being in a direction away from the longitudinal axis of the device, and said wedge members having smoothly-curved fibre-engaging faces which converge towards said adjacent portion and which cause the fibres to pass smoothly along curved paths from one said portion to the other said portion without abrupt change in direction whereby the setting-up of stress concentrations in the fibres is avoided.

5. A blade, suitable for a propeller, compressor or fan, including a structure having a hollow root portion of fibrous-reinforced plastics material and two rigid members having their longitudinal axes coincident, said material comprising fibres which are unlooped at their free ends and disposed between said rigid members, and wedge members positioned between certain of said fibres splaying said fibres apart so that they are grouped and positively held between the two rigid members, said wedge members each having smoothly-curved fibre-engaging faces which converge towards the working portion of the blade and cause the fibres to pass smoothly along curved paths from the working portion to the root portion without abrupt change in direction, whereby the setting-up of stress concentrations in the fibres is avoided.

6. A blade, suitable for a propeller, compressor or fan, including a member of fibrous-reinforced plastics material having a root portion which is of substantially tubular form and which is held between two rigid concentric members of substantially cylindrical shape, the spaces between opposing surfaces of these members increasing in cross-sectional area in a direction towards the free ends of the fibres and root portion, thus to enable said fibres to be splayed apart by hollow wedge members extending into the root portion from the free ends of the fibres to wedge the material into engagement with said opposing surfaces for positive retention of said root portion with respect to said concentric members, said wedge members having smoothly-curved fibre-engaging faces which converge towards the working portion of the blade and cause the fibres to pass smoothly along curved paths from the working portion to the root portion without abrupt change in direction, whereby the setting-up of stress concentrations in the fibres is avoided.

7. A device having an end portion and a portion adjacent thereto, both of fibrous-reinforced plastics material, said end portion including wedge members which intervene between groups of unlooped free end portions of fibres of the said material so as to enlarge said end portion and said wedge members having smoothly-curved fibre-engaging faces which converge towards said adjacent portion and which cause the fibres to pass smoothly along curved paths from one said portion to the other said portion without abrupt change in direction, whereby the setting-up of stress concentrations in the fibres is avoided, the curved external faces of said end portion carrying pads, in intimate contact with said curved external faces, which build up the cross-section of the end portion to a desired overall shape suitable for retention of the device in a slot of corresponding shape.

8. A device as claimed in claim 7, which device comprises a blade suitable for a compressor, propeller or fan, the said end portion forming the bade root portion and said desired overall shape being dove-tail, said slot being formed in the drum, hub or disc of the compressor, propeller or fan.

References Cited
UNITED STATES PATENTS

| | | | |
|---|---|---|---|
| 2,182,812 | 12/1939 | Lougheed | 416—230 |
| 2,240,873 | 5/1941 | Thomas | 416—134 |
| 2,868,441 | 1/1959 | Reutt | 416—230 |
| 2,929,755 | 3/1960 | Porter | 416—229 X |
| 3,021,246 | 2/1962 | Hütter et al. | 416—230 X |

FOREIGN PATENTS

| | | | |
|---|---|---|---|
| 169,393 | 9/1921 | Great Britain | 416—229 |
| 179,632 | 5/1922 | Great Britain | 416—229 |

EVERETT A. POWELL, JR., Primary Examiner

U.S. Cl. X.R.

416—230, 241